(12) United States Patent
Singh et al.

(10) Patent No.: US 8,946,929 B2
(45) Date of Patent: Feb. 3, 2015

(54) METHOD AND APPARATUS FOR EFFECTIVE UTILIZATION OF ENERGY STORAGE COMPONENTS WITHIN A MICROGID

(75) Inventors: Harmohan N. Singh, Rockaway Township, NJ (US); Cristian Anghel, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 640 days.

(21) Appl. No.: 13/289,328

(22) Filed: Nov. 4, 2011

(65) Prior Publication Data

US 2013/0113287 A1 May 9, 2013

(51) Int. Cl.
*H02J 3/28* (2006.01)
*H02J 3/32* (2006.01)
*H02J 1/14* (2006.01)
*H02J 4/00* (2006.01)
*H02J 3/38* (2006.01)

(52) U.S. Cl.
CPC ..... *H02J 3/32* (2013.01); *H02J 1/14* (2013.01); *H02J 3/28* (2013.01); *H02J 4/00* (2013.01); *H02J 3/387* (2013.01)
USPC .............................................. 307/52; 307/82

(58) Field of Classification Search
None
See application file for complete search history.

(56) References Cited

U.S. PATENT DOCUMENTS

| 6,985,799 | B2 * | 1/2006 | Zalesski et al. ............... 700/286 |
| 7,085,660 | B2 | 8/2006 | Mansingh et al. |
| 7,313,465 | B1 | 12/2007 | O'Donnell |
| 7,315,769 | B2 | 1/2008 | Balan et al. |
| 7,839,027 | B2 | 11/2010 | Shelton et al. |
| 7,920,942 | B2 | 4/2011 | Lasseter et al. |
| 7,983,799 | B2 | 7/2011 | Bose et al. |
| 7,991,512 | B2 | 8/2011 | Chandra et al. |
| 8,421,270 | B1 * | 4/2013 | Miller et al. ..................... 307/65 |
| 2008/0053716 | A1 * | 3/2008 | Scheucher .................... 180/2.1 |
| 2008/0094031 | A1 * | 4/2008 | Singh et al. .................. 320/132 |
| 2008/0167756 | A1 | 7/2008 | Golden et al. |
| 2011/0077792 | A1 | 3/2011 | Shimoda et al. |
| 2011/0082597 | A1 | 4/2011 | Meagher |
| 2011/0093127 | A1 | 4/2011 | Kaplan |
| 2011/0106322 | A1 | 5/2011 | Ou |
| 2011/0140648 | A1 * | 6/2011 | Lee ............................... 320/101 |
| 2012/0059527 | A1 * | 3/2012 | Beaston et al. ............... 700/295 |

* cited by examiner

*Primary Examiner* — Rexford Barnie
*Assistant Examiner* — David Shiao
(74) *Attorney, Agent, or Firm* — Shimokaji & Assoc., P.C.

(57) ABSTRACT

A method for effectively utilizing energy storage components within a microgrid may include the steps of connecting a first plurality of energy storage components to a DC bus through switches, connecting a second plurality of energy storage components to an AC bus through inverters, connecting controllers to the energy storage components, connecting a first plurality of the controllers to the DC bus to regulate bidirectional flow of energy between the DC bus and the first plurality of energy storage components and connecting a second plurality of the controllers to the AC bus to regulate bidirectional flow of energy between the AC bus and the second plurality of energy storage components. The controllers may be interconnected with a local energy storage system bus and controlled via a master microgrid controller connected to the local energy storage system bus. The controllers may have a state of charge and a state of health algorithm adapted to measure the state of charge and the state of health of the energy storage components under dynamic charge or discharge conditions.

10 Claims, 3 Drawing Sheets

METHOD AND APPARATUS FOR EFFECTIVE UTILIZATION OF ENERGY STORAGE COMPONENTS WITHIN A MICROGID

BACKGROUND OF THE INVENTION

The present invention relates to apparatus and methods for energy storage and, more particularly, apparatus and methods for permitting in-situ determination and utilization of the state of charge and state of health of storage components in a microgrid.

Microgrids are rapidly expanding as part of the effort to reduce dependence on fossil fuels and to increase the efficiency of generating electric energy. The microgrids typically consist of power generators, renewable energy sources and energy storage components. For energy storage, components such as rechargeable batteries, super-capacitors, fuel-cells, and the like, are used. One of the main objectives of the microgrids is to effectively use the electric storage to maintain line voltage regulation which can mainly occur due to the unpredictable duty cycles of the renewables. In order to lower the mass, volume and cost of each energy storage components and for microgrid life cycle cost reduction, it is essential that the stored energy is expended and restored efficiently while maximizing energy storage component operational life.

Conventional energy storage component charge/discharge control is based upon terminal voltage monitoring and the labeled component capacity values. The terminal voltage, particularly in the dynamic charge/discharge environment of the electric grid, is not a true indicator of storage component state of charge and can result in overcharge or overdischarge of the device. Further, the component capacity fades with time and, if the component utilization is not based upon its current capacity, premature wear and system failure can result.

As can be seen, there is a need for methods and apparatus for effective utilization of diverse types of energy storage components with a microgrid based upon their state of charge and state of health.

SUMMARY OF THE INVENTION

In one aspect of the present invention, a method for effectively utilizing energy storage components within a microgrid comprises connecting one or more energy storage components to an electric bus; connecting a controller to the energy storage components, the controller having a state of charge and a state of health algorithm adapted to measure the state of charge and the state of health of the energy storage components under dynamic charge or discharge conditions; connecting one of a switch or power electronics to the controller to regulate bidirectional flow of energy between the electric bus and energy storage component; interconnecting the controllers with a local energy storage system bus; and controlling the controllers via a master microgrid controller connected to the local energy storage system bus.

In another aspect of the present invention, a method for controlling charge and discharge of energy storage components in a microgrid comprises managing a state of charge of the energy storage components to preserve a lifespan of the energy storage components; and performing trend analysis of a state of health of the energy storage components to predict advance maintenance actions.

In a further aspect of the present invention, a microgrid energy storage component system comprises one or more energy storage components connected to an electric bus; a controller connected to the energy storage components, the controller having a state of charge and a state of health algorithm adapted to measure the state of charge and the state of health of the energy storage components under dynamic charge or discharge conditions; one of a switch or power electronics connected to the controller to regulate bidirectional flow of energy between the electric bus and energy storage component; a local energy storage system bus interconnected with the controllers; and a master microgrid controller connected to the local energy storage system bus.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide an online method and apparatus for determining state of charge (SoC) and state of health (SoH) of energy storage components in a microgrid environment The SoC and SoH can be determined from the energy storage component's voltage, charge or discharge current and temperature.

Figure 1:
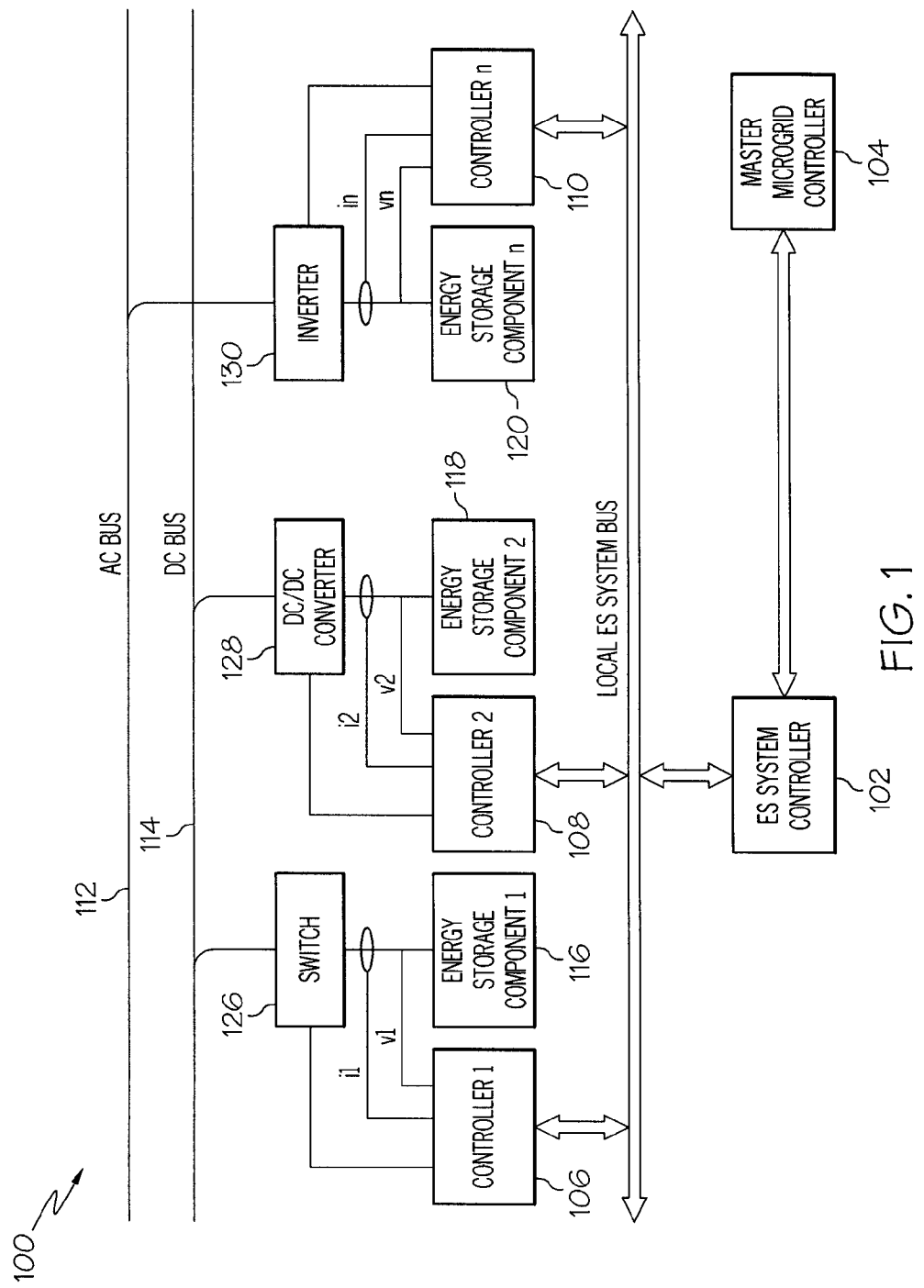
FIG. 1 is a block diagram of a microgrid energy storage component management topology according to an exemplary embodiment of the present invention.
Figure 2:
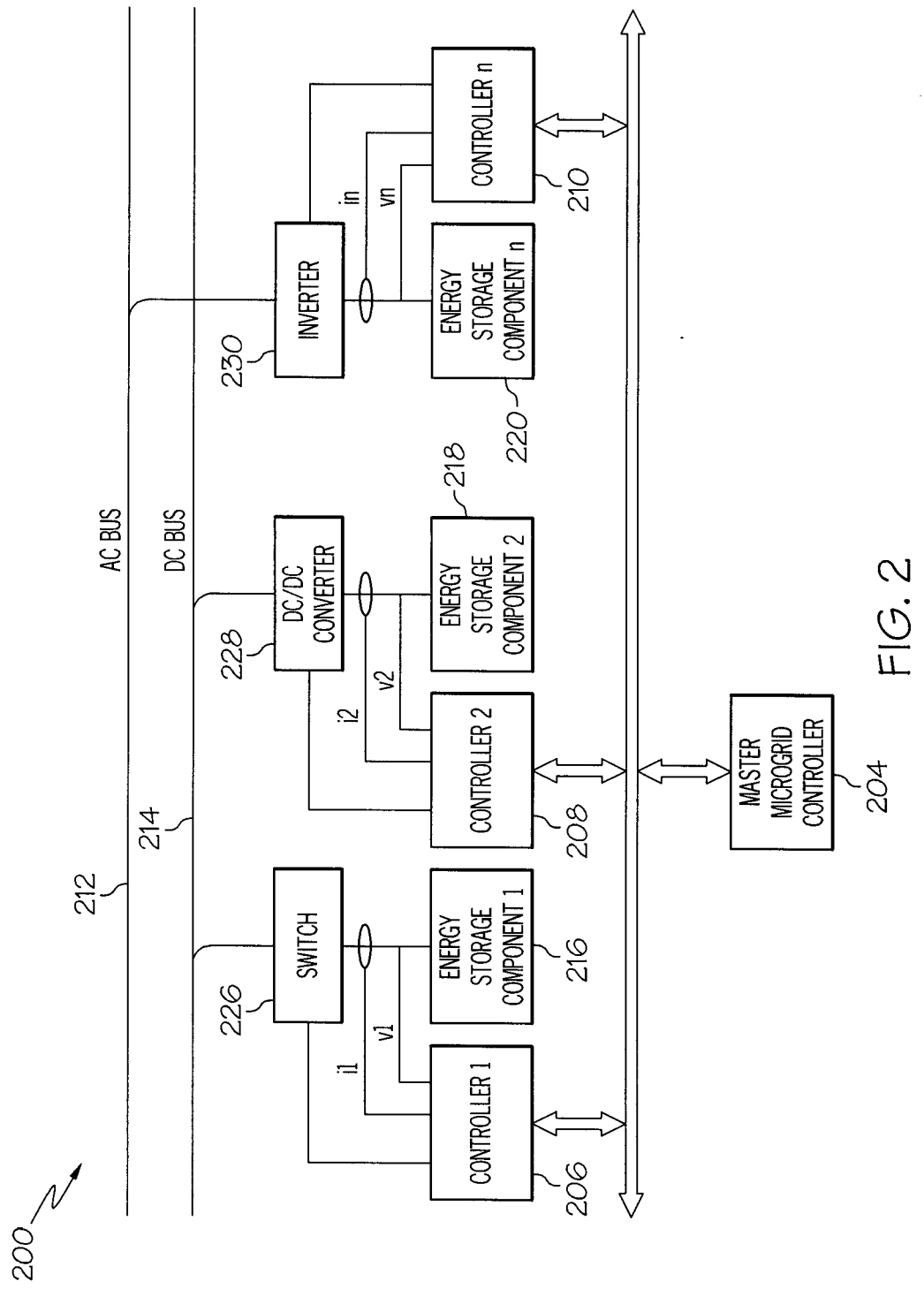
FIG. 2 is a block diagram of a microgrid energy storage component management topology according to another exemplary embodiment of the present invention.

Referring to FIGS. 1 and 2, there are shown microgrid energy storage component management systems 100, 200 according to an exemplary embodiment of the present invention. The systems 100, 200 may provide for effective utilization of energy storage components within a microgrid.

FIG. 1 shows the energy storage component management system 100 where a local energy storage system controller 102 may manage charge/discharge operation for all energy storage components (as described in greater detail below) based upon parameters provided by a master microgrid controller 104 and the individual controllers 106, 108, 110.

FIG. 2 shows the energy storage component management system 200 where each controller 206, 208, 210 directly interfaces with a master system controller 204. The master system controller 204 may perform charge/discharge operation for the subordinate energy storage components based upon the microgrid power status and the state of charge and state of health status of the energy storage components.

Referring to both FIGS. 1 and 2, for microgrid systems consisting of more than one cluster of energy systems, a hierarchal control scheme may be implemented. Each exemplary system may include an alternate current (AC) 112, 212 and a direct current (DC) bus 114, 214 and several energy storage components 116, 118, 120 and 216, 218, 220.

The energy storage components can be of different types, such as primary or secondary batteries, supercapacitors, fuel cells, and the like. The energy storage component 116, 216 may have a terminal voltage compatible with the DC bus 114, 214 and may be connected to the DC bus 114, 214 via a switch 126, 226. The energy storage component 118, 218 may interface with the DC bus 114, 214 via a bidirectional DC to DC converter 128, 228. The energy storage component 120, 220 may interface with the AC bus 114, 214 via a bidirectional inverter 130, 230. The controllers 106, 108, 120, 206, 208, 220 may include state of health and state of charge algorithms for the corresponding energy storage components and may be capable of managing the power electronics (such as converters 128, 228 or inverters 130, 230) or switches (such as switch 126, 226) that provide interface between the energy storage components and the power bus. In some embodiments of the present invention, the power electronics may be integrated into the controller. For example, the DC/DC converter 128 may be integrated into the controller 108.

Exemplary parameters needed to derive the state of charge and state of health data are energy storage component real-time voltage, current and temperature. These parameters may be input to the appropriate state of charge and state of health algorithms for the energy storage components. Without being limited to any particular method, in an exemplary embodiment of the present invention, the state of charge and state of health may be determined by methods described in commonly owned U.S. Pat. No. 7,576,545, the contents of which are herein incorporated by reference.

Figure 3:
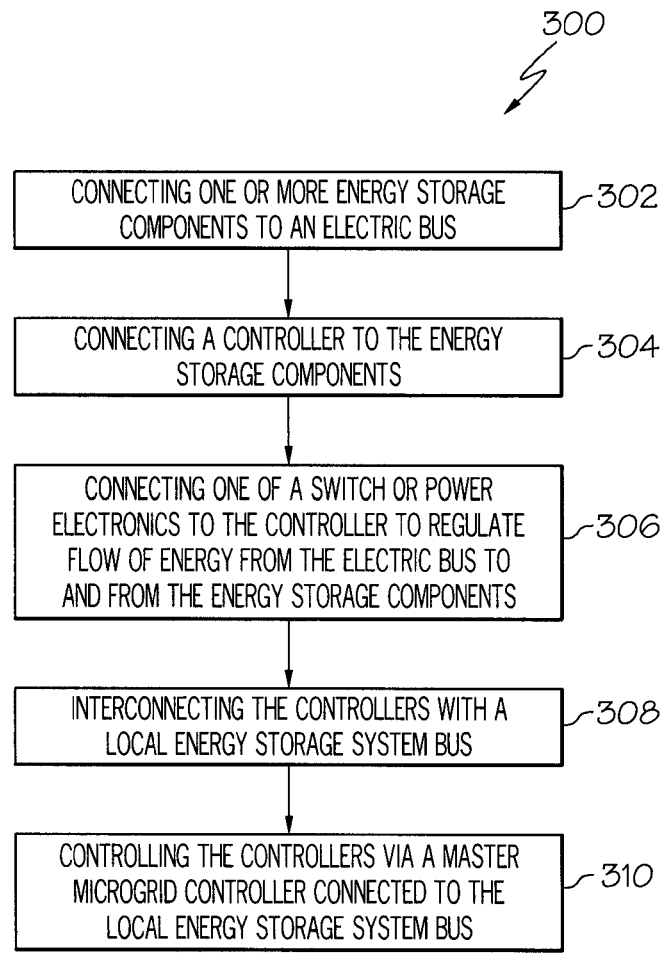
FIG. 3 is a flow chart describing a method for the utilization of energy storage components within a microgrid, according to an exemplary embodiment of the present invention.

Referring to FIG. 3, there is described a method 300 for effectively utilizing energy storage components within a microgrid. The method may include a step 302 of connecting one or more energy storage components to an electric bus. The energy storage components may be a battery, supercapacitor, fuel cell, or the like. The electric bus may be an AC bus or a DC bus. A step 304 may include connecting a controller to the energy storage components. The controller may include algorithms for determining the state of charge and the state of health of the energy storage components. A step 306 may include connecting one of a switch or power electronics to the controller to regulate flow of energy from the electric bus to and from the energy storage components. A step 308 may include a step of interconnecting the controllers with a local energy storage system bus. A step 310 may include a step of controlling the controllers via a master microgrid controller connected to the local energy storage system bus.

Under the proposed methods, in deploying an energy storage system for charge and discharge operation, the following parameters may be taken into consideration: 1) Energy and power demand, 2) Energy storage component type, 3) Forecasted/estimated ON time, 4) State of charge/depth of discharge, and 5) Duty cycle balancing (if identical or similar energy storage components exist, their utilization may be managed to equalize usage).

The state of health of each energy storage component may be available and utilized in microgrid management. The state of health of each energy storage component may be expressed in terms of a number. When the component state of health depletes below an acceptable limit, maintenance action may be indicated. The state of health of each component may be monitored and recorded by the microgrid maintenance system. Energy storage component state of health trend analysis may be conducted and advance maintenance actions may be indicated.

The apparatus and methods of the present invention may provide 1) a single or multilevel hierarchal control of energy storage components that insure robust operation of the microgrid, 2) a robust control strategy based on the energy storage component state of charge and state of health, 3) energy storage component life preservation/extension through state of charge management and duty cycle balancing, and 4) state of health trend analysis and energy storage component prognostics.

It should be understood, of course, that the foregoing relates to exemplary embodiments of the invention and that modifications may be made without departing from the spirit and scope of the invention as set forth in the following claims.

We claim:

1. A method for effectively utilizing energy storage components within a microgrid, the method comprising:
   connecting a first plurality of energy storage components to a DC bus through switches;
   connecting a second plurality of energy storage components to an AC bus through inverters;
   connecting controllers to the energy storage components, the controllers having a state of charge and a state of health algorithm adapted to measure the state of charge and the state of health of the energy storage components under dynamic charge or discharge conditions;
   connecting a first plurality of the controllers to the DC bus to regulate bidirectional flow of energy between the DC bus and the first plurality of energy storage components;
   connecting a second plurality of the controllers to the AC bus to regulate bidirectional flow of energy between the AC bus and the second plurality of energy storage components;
   interconnecting the controllers with a local energy storage system bus; and
   controlling the controllers via a master microgrid controller connected to the local energy storage system bus.

2. The method of claim 1, wherein the energy storage components include at least one of a battery, a supercapacitor, and a fuel cell.

3. The method of claim 1, further comprising the steps:
   connecting a third plurality of energy storage components to the DC bus through a DC/DC converter;
   connecting a third plurality of the controllers to the DC bus to regulate bidirectional flow of energy between the DC bus and the third plurality of energy storage components.

4. The method of claim 1, wherein the first plurality of energy storage components have terminal voltages substantially equal to a voltage of the DC bus.

5. The method of claim 1, further comprising receiving commands from the master microgrid controller with an energy storage system controller prior to delivering the commands to the local energy storage system bus.

6. The method of claim 1 further comprising the steps:
   managing a state of charge of the energy storage components to preserve a lifespan of the energy storage components; and
   performing trend analysis of a state of health of the energy storage components to predict advance maintenance actions.

7. The method of claim 6, further comprising balancing charge and discharge of like energy storage components via duty cycling.

8. The method of claim 6, further comprising controlling charge and discharge via a controller electrically connected to the energy storage components, the controller having algorithms for determining the state of charge and the state of health of the energy storage components.

9. A microgrid energy storage component system comprising:

a first plurality of energy storage components connectable with a DC bus through switches;

a second plurality of energy storage components connectable to an AC bus through inverters;

a controller connected to each of the energy storage components, the controller having a state of charge and a state of health algorithm adapted to measure the state of charge and the state of health of the energy storage components under dynamic charge or discharge conditions;

the controllers being configured to regulate bidirectional flow of energy between the energy storage components and the buses to which the corresponding energy storage components are connectable;

a local energy storage system bus interconnected with the controllers; and a master microgrid controller connected to the local energy storage system bus.

10. The system of claim 9, further comprising a third plurality of energy storage components connectable to the DC bus via bidirectional DC to DC converters.

\* \* \* \* \*